Patented Oct. 18, 1949

2,485,102

UNITED STATES PATENT OFFICE 2,485,102

CEMENT COMPOSITION AND INDURATING MIXTURE THEREFOR

Donald R. MacPherson, University Heights, Wesley G. France, Columbus, and Fred M. Ernsberger, Ada, Ohio, assignors to The Master Builders Company, Cleveland, Ohio, a corporation of Ohio No Drawing. Application November 29, 1945, Serial No. 631,796

9 Claims. (Cl. 106—90)

This invention relates to hydraulic cement compositions such as concrete or mortar and to indurating compositions for addition to concrete or mortar mixes. It especially relates to such compositions and mixes containing a plasticizing agent which permits substantial improvement in the strength of structures prepared from such compositions.

The use of agents such for example as waste sulfite liquor to reduce the water-cement ratio of an hydraulic cement mortar or concrete has permitted substantial improvement in the properties of structures formed thereof. However, there have been some disadvantages connected with the use of the agents heretofore proposed which have in some measure limited the commercial acceptance of the cement compositions containing them. Thus, when small amounts of raw waste sulfite liquor or the dry residue thereof is added to cement mixes, as disclosed is United States Patents 2,169,980 and 2,229,311 of Edward W. Scripture, the water-cement ratio may be reduced a very substantial amount and the strength of the concrete at later ages is substantially increased. The use of these plasticizing agents with some cements may be disadvantageous in that the strength at early ages, such as one to seven days, may be less than that of the plain mortar or concrete mix, and in that the amount for optimum results in some instances may be critical, even though an accelerator be present.

The Mark Patent 2,141,570 discloses the addition to cement of a lignin sulfonate prepared by the so-called "Howard process" set forth in Patents 1,856,558 and reissue Patent 18,268. While such lignin sulfonate is found to produce fairly high early strengths in mortar or concrete, the strengths of these at later ages are not nearly as high as those of concrete or mortar which contains the same quantity of waste sulfite liquor solids, disclosed in the aforementioned Scripture patents.

The Daniel Patent 2,201,812 discloses the addition to cement of lignin materials obtained by concentrating waste sulfite liquor in a vacuum, neutralizing the concentrate and dialyzing the neutralized concrete. Tests as shown hereafter more in detail relative to the incorporation of this material in cement show that while it may be slightly more effective than the lignin derivatives of the "Howard process," as disclosed by the aforementioned Mark patent, in reducing the water-cement ratio required to obtain a given plasticity, it is much less effective in this characteristic than is the product disclosed by the aforementioned Scripture patents. It also had an adverse effect on the strength of concrete or mortar mixes at early and late ages.

It is an object of the present invention to provide a cement composition or an indurating composition for cement mixes comprising ingredients derived from waste residue such as waste sulfite liquor which markedly improves the strength of concrete at later ages, and which is not deleterious to cement mixes if inadvertently added in relatively larger amounts than usually recommended to be used.

It is another object of the present invention to provide a concrete or mortar mix which has greatly improved strength at later ages, and which may be made in a given consistency with a relatively lower water-cement ratio than may be obtained with a plain cement or concrete mix having the same proportion of cement and aggregates.

It is another object of the present invention to provide a method of preparing concrete having an improved compressive strength at early as well as at late ages.

It is a further object of the present invention to provide an indurating composition for addition to cement or concrete mixes which accelerates the hardening of the cement as well as permits a reduction in the water-cement ratio, while at the same time giving increased compressive strength at later ages.

A still further object of the present invention is to provide a dry cement which when mixed with aggregate and sand permits a reduction in the normal amount of water and gives higher strengths to products made therewith.

We have found that the above and other objects, which will be apparent from the following description of the invention, are accomplished by incorporating in cement mixes the dialyzed lignin residuum solids (either in dry form or in the form of a slurry, a solution, or a dispersion in water) retained by the dialyzing membrane upon the dialysis of waste sulfite liquor that has not been preconcentrated (i. e. the liquor which has a specific gravity of less than 1.1 and preferably not substantially exceeding 1.05) and preferably that has not been neutralized prior to dialysis. A major basis of the present invention lies in the discovery that the dialyzed lignin residuum solids obtained by dialyzing the unconcentrated waste sulfite liquor have different and superior properties in cement mixes than have lignin solids obtained by dialyzing the previously concentrated neutralized waste sulfite liquor product. Even though the concentration of the waste sulfite liquor is accomplished in a vacuum, as set forth in the Daniels patent, the lignin solids obtained from the concentrate through dialysis is inferior in cement mixes to the dialyzed lignin residuum solids from waste sulfite liquor which was not concentrated prior to dialysis. It is also found that these dialyzed lignin residuum solids from waste sulfite liquor that was not concentrated prior to dialysis produce a result in cement mixes which is much superior to that produced by the undialyzed waste sulfite liquor or to that produced by the Howard process, as set forth in the aforementioned Mark patent.

The concentration of waste sulfite liquor prior to dialysis may have been conceived to offset dilution and thus simplify the dialysis or reduce the size of the apparatus required. However, the concentration of raw waste sulfite liquor obviously results in increased concentration of acids therein, which increased concentration may have an adverse effect on dialyzing membranes. This apparently has been the basis for the practice of neutralizing concentrated liquor prior to any dialysis.

It appears that it is the concentration as disclosed by Daniels, i. e., the concentrating of waste sulfite liquor in the presence of products which may be removed by diffusion through a suitable membrane, which produces the undesirable effect on the solids remaining after dialysis. This seems to be borne out by the discovery that the improvement in cement mixes obtainable by utilizing therein the solids of the dialyzed unconcentrated lignin residuum is superior to that produced by utilizing either the solids from the undialyzed raw product or the solids obtainable by dialysis of concentrated waste sulfite liquor, whether it be neutralized or unneutralized. Best results are obtainable from the product obtained by the dialysis of unconcentrated and unneutralized waste sulfite liquor.

The benefits of the present invention may be obtained when the dialyzed lignin residuum solids obtained from the dialysis of the unconcentrated waste liquor are added as aforementioned as a separate addition to cement mixes, as the mixes are being prepared for use; when added to or admixed with dry cement in the proportions desired, or when, as is often preferable, they are ground with the cement, i. e., admixed with the cement clinker during the grinding operations to provide an intimate contact with the cement particles.

As little as 0.01% of these dialyzed solids (freed from the major portion of the permeable water soluble substances) based on the weight of the cement is noticeably effective in improving the properties of cement or concrete mixes and products produced therefrom.

An amount of the dialyzed lignin residuum solids much greater than about .5% or .6% of the weight of the cement is not usually commercially economical and for some purposes may even produce results that are no better than those obtained with lesser amounts. The amount of dialyzed lignin residuum solids preferably present is usually about .15% or .2% to about .35% or .4% of the weight of the cement, although as little as .01% gives some desirable effect.

It is found that a particularly desirable indurating composition for cement mixes comprises dialyzed lignin residuum solids remaining after dialysis of unconcentrated neutralized or unneutralized waste sulfite liquor together with a finely divided filling material such as a pozzolana, and/or an accelerator, such for example as calcium chloride, capable of accelerating the hardening and setting of cement mixes. These ingredients are preferably so proportioned to provide when mixed with cement .01% to .6% of the solid ingredients remaining after dialysis of the unconcentrated waste sulfite liquor and at the same time, if an accelerator be desired, to provide .1% to 2.5% of the accelerator, all percentages being based on the weight of the cement. The additional ingredients such as fly ash, or other pozzolanic material, etc. are preferably present in admixture with the dialyzed lignin residuum solids and calcium chloride in the indurating composition.

The dry, wet, or dissolved dialyzed lignin residuum solids are also found to give particularly outstanding results when used in cement, mortar or concrete mixes together with a derivative of benzoic acid such as set forth in one or more of the Scripture Patents 2,264,336, 2,360,517, 2,360,518 and 2,360,519. A preferred derivative of benzoic acid is salicylic acid or a salt thereof.

A particularly desirable indurating composition for cement mixes therefore comprises these dialyzed lignin residuum solids and a substituted benzoic acid or a salt or ester thereof, such as salicylic acid or a compound containing the salicylic group, with or without an accelerator such as calcium chloride and with or without a finely divided filling material such as a pozzolana. The ingredients in this indurating composition should be so proportioned that when the composition is mixed with cement there will be present about .01% to about .6% of the dialyzed lignin residuum solids and at the same time .01% to .5% of substituted benzoic acid, salt or ester thereof. The pozzolanic material may be present in any suitable proportion in an indurating composition, but the accelerator such as calcium chloride, if used, should be present in the amount of .1% to about 2.5% of the cement, by weight when the indurating composition is incorporated in the cement, concrete or mortar mix to improve the properties thereof.

The solids obtained by simply concentrating the raw waste sulfite liquor, while producing a desirable effect in cement mixes, are not desirable in commercial practice when the amount used exceeds about .15% of the weight of the cement, unless an accelerator such as calcium chloride be present to improve the hardening and setting properties in concrete. The dialyzed lignin residuum solids from unconcentrated waste sulfite liquor, whether neutralized or unneutralized, on the other hand act quite differently in cement mixes from the solids from raw waste sulfite liquor obtained by simple concentration, in that they also give outstanding results in the absence of an accelerator.

Raw waste sulfite liquor prior to dialysis is generally characterized by having a pH of 2 to 4 and usually 2 to 3. The specific gravity of the material is generally less than 1.1.

It is seen herein that applicant's product can best be defined by the process of manufacture, as the ordinary commercial chemical analysis does not adequately characterize the active ingredients or distinguish these materials over those present in the products produced by other methods. The improved character of lignin products of the present invention are primarily noted in the character of the cement compositions in which they are present.

While neutralization of the waste sulfite liquor is not desired prior to dialysis, there may be small additions of lime to the liquor without any material change in pH. Such additions do not bring the pH anywhere near neutral and still permit the attainment of the benefits of the dialyzed lignin residuum solids in concrete. In the normal process of neutralization, the excesses of sulfuric and sulfurous acids are precipitated as salts and removed as sludge. While such neutralization may be made prior to dialysis to give dialyzed lignin residuum solids capable of imparting to cement mixes the main advantages imparted by the dialyzed solids from the unneutralized waste sulfite liquor, it appears that the acids normally present may act as buffers during dialysis to prevent change in certain components of the lignin solids and thus retain more of the desired properties. At the termination of the dialysis, which may be accomplished by any convenient method, the pH is usually close to neutral.

The improvement in properties of concrete containing the solids (which may if desired be retained in liquid medium) from dialyzed raw or neutralized, unconcentrated waste sulfite liquor over equal amounts of the solids obtained from other processes, as illustrated in the aforementioned prior art, is illustrated by the following example:

*Example 1*

Seven separate concrete mixes were prepared using the same proportions of identical solid constituents. Each mix, save the first, which served as a control, contained 500 grams hydraulic cement such as Portland cement, 1375 grams sand, 1125 grams pea gravel and .32% by weight of the cement of one of the various lignin products derived from waste sulfite liquor. The percentage of lignin product was based on the amount of solids which would remain after the material was vacuum dried at 80° C. until no further loss in weight occurred. In the preparation of each of the mixes, the water-cement ratio was selected to provide substantially identical slump, i. e., about two inches on a six-inch cone.

The following tables show the relative amounts of water required per sack of the hydraulic cement, the total air entrained in the various mixes, the compressive strengths of 2" x 2" cubes in pounds per square inch, at various ages, together with relative compressive strengths of the mixes at various ages, and the average reductions in water permitted by the use of the additive over the corresponding plain mix. Each of the values given is the average from 6 tests.

Table 1

| Mix No. | Water Reduction over corres. Plain Mix [1] | Air Content, Per Cent by Volume | Relative Compressive Strengths | | |
|---|---|---|---|---|---|
| | | | 1 Day | 7 Days | 28 Days |
| 1 (plain) | | 0.4 | 100 | 100 | 100 |
| 2 | 10 | 5.9 | 75 | 89 | 88 |
| 3 | 8 | 2.3 | 112 | 102 | 103 |
| 4 | 14 | 4.0 | 68 | 97 | 107 |
| 5 | 14 | 3.6 | 61 | 99 | 109 |
| 6 | 13 | 3.5 | 100 | 101 | 115 |
| 7 | 13 | 3.0 | 96 | 104 | 115 |

[1] Consistency and cement factor constant.

Table 2

| Mix No. | Ratio Water-Cement Gallons/sack | Air Content, Per Cent by Volume | Compressive Strength, lbs./sq. in. | | |
|---|---|---|---|---|---|
| | | | 1 Day | 7 Days | 28 Days |
| 1 | 7.67 | 0.4 | 500 | 3,050 | 4,375 |
| 2 | 6.90 | 5.9 | 375 | 2,725 | 3,850 |
| 3 | 7.03 | 2.3 | 590 | 3,125 | 4,485 |
| 4 | 6.61 | 4.0 | 340 | 2,965 | 4,700 |
| 5 | 6.61 | 3.6 | 305 | 3,015 | 4,750 |
| 6 | 6.66 | 3.5 | 500 | 3,075 | 5,040 |
| 7 | 6.67 | 3.0 | 480 | 3,175 | 5,015 |

Mix No. 1 in each of the tables was the plain mix without an addition.

In mix No. 2 the addition was a concentrated product (syrupy liquid) obtained by dialyzing the neutralized and concentrated waste sulfite liquor, as set forth in the aforementioned Daniels patent.

Mix No. 3 was a purified lignin compound obtained by the Howard process, as set forth in the aforementioned Mark patent; it was added in the form of a dry powder, as obtained from the manufacturer.

In mixes No. 4 and No. 5 the lignin product was the undialyzed dried whole waste sulfite liquor obtained from two separate sources.

The addition in mix No. 6 was the lignin residuum solids in the form of a concentrated liquid slurry or solution prepared by evaporating the dialyzed liquid residuum from unconcentrated and unneutralized waste sulfite liquor, as preferred in accordance with the present invention.

Mix No. 7 was the lignin residuum solids (in a dry or concentrated form) obtained by dialyzing the unconcentrated but substantially completely neutralized waste sulfite liquor also in accordance with the present invention.

It will be seen from the above that the dialyzed lignin residuum solids from the unconcentrated raw or neutralized waste sulfite liquor provide far greater compressive strength at later ages in concrete than is obtained by lignin compounds obtained by other processes as heretofore utilized in cement mixes. It is also seen there is no noticeable retarding action by the incorporation of the dialyzed lignin residuum solids from the unconcentrated waste sulfite liquor. In fact, when twice the amount of dialyzed unconcentrated lignin residuum solids shown in the above table was used, equally good results were obtained in the concrete, whereas when twice the amount of any of the other materials shown in the table was used, the properties were greatly impaired.

The improvements shown by the dialyzed lignin residuum solids in the above table is indicative only of the improvement in cement mixes obtained when pea gravel was the coarsest aggregate used. When larger aggregate concrete mixes are prepared, the improvement in the properties obtained by the use of dialyzed lignin residuum solids is far superior to that shown. Thus, when concrete mixes were prepared with the same proportion of dialyzed lignin residuum solids of the aforementioned mixes 6 and 7, using ¾" stone, with a cement factor of 5.5 sacks per cubic yard, the increases in compressive strength over that of the control batch having the same cement factor, the same aggregate, the same slump and no lignin addition were 49% and 58% respectively at one day for the dialyzed lignin residuum solids obtained from the unneutralized and unconcentrated waste sulfite liquor (mix 6) and the dialyzed lignin residuum solids obtained from the neutralized and unconcentrated waste sulfite liquor (mix 7). Similarly the twenty-eight day strengths were increased 21% and 26% respectively over that of the control.

The improvements in freezing and thawing of concrete by the addition of relatively small amounts of the dialyzed lignin residuum solids of the unconcentrated raw or neutralized waste sulfite liquor is illustrated in the following table:

*Table 3*

| Mix | Addition Percent of Cement | Cement Factor (Sacks per Cu. Yd.) | Water-Cement Ratio, Gallons per Sack | Relative Dynamic Modulus (E) after indicated cycles of freezing and thawing | | | | | |
|-----|---|---|---|---|---|---|---|---|---|
| | | | | 0 | 40 | 60 | 100 | 150 | 200 |
| A | None | 5.30 | 7.86 | 100 | 10 | C.D.¹ | | | |
| B | 0.32 | 5.32 | 6.62 | 100 | 101 | 101 | 101 | 96 | 96 |
| C | 0.32 | 5.36 | 6.66 | 100 | 102 | 101 | 105 | 102 | 103 |

¹ Completely disintegrated.

Mixes A, B and C were identical, ¾" stone being substituted for pea gravel in the previous mixes, the inorganic solid constituents being the same. The mixes were each made to a slump of about three inches using a 12-inch cone. The cement factor in sacks per cubic yard, water-cement ratio and the relative dynamic moduli after 0, 40, 60, 100, 150 and 200 cycles are shown for each of the mixes. Tests were made by utilizing six 3" x 3½" x 15" beams from each batch. The values given are the average results.

It will be noted from the above Table 3, that, while the control completely disintegrated prior to 60 cycles, the mixes B and C involving the present invention (containing the dialyzed lignin residuum solids from raw or neutralized waste sulfite liquor) were substantially unaffected at 200 cycles.

From the above table it is seen that the increase in durability of concrete containing the dialyzed lignin residuum solids as described above is very substantial. This improvement is far greater than that which could be due to the mere reduction in the water cement ratio produced by these materials. It is therefore apparent that these dialyzed solids themselves exert a substantial influence on the strength and consequent durability of the concrete in which they are incorporated. The improvement in durability to freezing and thawing is not the only improvement in durability had by concrete prepared in accordance with the present invention, as it may also be shown that such concrete or mortar has greater resistance to sulphates and to disintegration due to cement-alkali-aggregate reactions.

The improved results in cement or concrete mixes obtained by the process of the present invention may be due to the fact that the lignin residuum solids obtained by dialysis of the unconcentrated waste liquor have not been subjected to deteriorating influences as have solids from waste sulfite liquor which has been concentrated at elevated temperatures in the presence of mineral acids. Thus, concentration at elevated temperatures in the presence of mineral acids would be expected to cause hydrolytic and/or thermal fragmentation of the active particles, leading to decreased surface activity of the particles. This is in line with the generally accepted belief that smaller particles are less surface active. Neutralization of a concentrated waste sulfite liquor would be expected to saturate irreversibly many of the anionic centers of the active particles with calcium, thereby decreasing the negative electrokinetic potential of the particles and their tendency to be positively adsorbed on the cement particles.

The term "membrane retained lignin residuum" as used herein designates the material retained by the dialyzing membrane in the dialysis of unconcentrated waste sulfite liquor whether the liquor be neutralized or unneutralized. The dialysis is carried to a sufficient degree to remove a substantial portion of the water soluble acids, bases and salts normally present in the waste sulfite liquor and capable of diffusing through a suitable membrane. Preferably the dialysis is sufficiently complete to remove the major portion of the water soluble crystalloids, so that if one subsequently concentrates the dialyzed lignin residuum to obtain the dialyzed lignin residuum solids in dry or concentrated form, one may retain the more desirable properties, as aforementioned, in cement mixes when they are incorporated therein. Most of the undesired water soluble substances are separated from the lignin residuum retained by the dialyzing membrane when the pH of the material within the membrane is 5 or greater in the case of the acid liquor. In the case of neutralized waste sulfite liquor the degree of dialysis should be continued for a time approximately equal to that required to reduce the acidity of an acid liquor to a pH of 5 or greater.

The Portland cement utilized in the above examples may be substituted by other hydraulic cements, such as aluminous cement. The quantities of the ingredients may be varied or the aggregate may be omitted entirely in accordance with the usual practice as recognized by those skilled in the art.

Furthermore, it is to be understood that the particular form of product shown and described and the particular procedure set forth are presented for purposes of explanation and illustration and that various modifications of said product and procedure can be made without departing from our invention as defined in the appended claims.

What we claim is:

1. A dry cement composition comprising an hydraulic cement and 0.01% to 0.6%, based on the weight of the cement, of a waste sulfite liquor fraction consisting of membrane retained lignin residuum solids resulting from dialysis of waste sulfite liquor to remove the major portion of its content of water-soluble crystalloids without concentrating or chemically altering the waste sulfite liquor prior to dialysis.

2. A dry cement composition comprising an hydraulic cement and 0.15% to 0.5% based on the weight of the cement, of a waste sulfite liquor fraction consisting of membrane retained lignin residuum solids resulting from dialysis of waste sulfite liquor to remove the major portion of its content of water-soluble crystalloids without concentrating or chemically altering the waste sulfite liquor prior to dialysis.

3. A dry cement composition comprising an hydraulic cement and 0.01% to 0.6%, based on the weight of the cement, of a waste sulfite liquor fraction consisting of membrane retained lignin residuum solids resulting from dialysis of a waste sulfite liquor having a specific gravity of less than 1.1 to remove the major portion of its content of water-soluble crystalloids without concentrating or chemically altering the waste sulfite liquor prior to dialysis.

4. A dry cement composition comprising an hydraulic cement and 0.15% to 0.5%, based on the weight of the cement, of a waste sulfite liquor fraction consisting of membrane retained lignin residuum solids resulting from dialysis of a waste sulfite liquor having a specific gravity of less than 1.1 to remove the major portion of its content of water-soluble crystalloids without concentrating or chemically altering the waste sulfite liquor prior to dialysis.

5. A concrete or mortar mix comprising aggregates, an hydraulic cement, and 0.01% to 0.6%, based on the weight of the cement, of a waste sulfite liquor fraction consisting of membrane retained lignin residuum solids resulting from dialysis of a waste sulfite liquor having a specific gravity of less than 1.1 to remove the major portion of its content of water-soluble crystalloids without concentrating or chemically altering the waste sulfite liquor prior to dialysis.

6. A concrete or mortar mix comprising aggregates, an hydraulic cement, and 0.15% to 0.5%, based on the weight of the cement, of a waste sulfite liquor fraction consisting of membrane retained lignin residuum solids resulting from dialysis of a waste sulfite liquor having a specific gravity of less than 1.1 to remove the major portion of its content of water-soluble crystalloids without concentrating or chemically altering the waste sulfite liquor prior to dialysis.

7. An indurating composition for hydraulic cement concrete or mortar mixes comprising finely divided pozzolanic material and, as the essential indurating agent, a waste sulfite liquor fraction consisting of membrane retained lignin residuum solids resulting from dialysis of a waste sulfite liquor having a specific gravity of less than 1.1 to remove the major portion of its content of water-soluble crystalloids without concentrating or chemically altering the waste sulfite liquor prior to dialysis.

8. The indurating composition of claim 7 including calcium chloride as a hardening and setting accelerator, the amount of calcium chloride being from about 1/8 to about 250 times the amount of said indurating agent by weight.

9. The indurating composition of claim 7 including material from the class consisting of substituted benzoic acid and its salts and esters, the amount of material from said class being from about 1/60 to 50 times the amount of said indurating agent.

DONALD R. MacPHERSON.
WESLEY G. FRANCE.
FRED M. ERNSBERGER.

REFERENCES CITED

The following references are of record in the file of this patent:

UNITED STATES PATENTS

| Number | Name | Date |
| --- | --- | --- |
| 2,081,642 | Scripture | May 25, 1937 |
| 2,141,570 | Mark | Dec. 27, 1938 |
| 2,169,980 | Scripture | Aug. 15, 1939 |
| 2,201,812 | Daniel | May 21, 1940 |
| 2,229,311 | Scripture | Jan. 21, 1941 |
| 2,360,519 | Scripture | Oct. 17, 1944 |